United States Patent
Bjerke et al.

(10) Patent No.: US 11,268,242 B2
(45) Date of Patent: Mar. 8, 2022

(54) YANKEE ADHESIVE COMPOSITIONS AND METHODS OF USING THESE COMPOSITIONS

(71) Applicant: Valmet AB, Sundsvall (SE)

(72) Inventors: Michael Bjerke, Hammaroe (SE); Bruno Tremblay, Sherbrooke (CA); Viktor Bergström, Karlstad (SE); Petter Ericsson, Karlstad (SE); Danilo Marcos, Karlstad (SE)

(73) Assignee: VALMET AKTIEBOLAG, Sundsvall (SE)

( * ) Notice: Subject to any disclaimer, the term of this patent is extended or adjusted under 35 U.S.C. 154(b) by 0 days.

(21) Appl. No.: 17/281,507

(22) PCT Filed: Oct. 19, 2018

(86) PCT No.: PCT/SE2018/051067
§ 371 (c)(1),
(2) Date: Mar. 30, 2021

(87) PCT Pub. No.: WO2020/080988
PCT Pub. Date: Apr. 23, 2020

(65) Prior Publication Data
US 2021/0310195 A1    Oct. 7, 2021

(51) Int. Cl.
*D21H 21/14* (2006.01)
*B31F 1/14* (2006.01)
(Continued)

(52) U.S. Cl.
CPC .............. *D21H 21/146* (2013.01); *B31F 1/14* (2013.01); *C08L 29/04* (2013.01); *D21F 5/181* (2013.01)

(58) Field of Classification Search
CPC ...... D21H 21/146; D21H 7/36; D21H 27/002; D21F 5/181; D21F 5/18; B31F 1/14; B31F 1/12; C08L 29/04; C08F 261/04
See application file for complete search history.

(56) References Cited

U.S. PATENT DOCUMENTS

| 4,440,898 | A | * | 4/1984 | Pomplun | ................ C09J 171/02 |
| | | | | | 524/503 |
| 4,501,640 | A | | 2/1985 | Soerens | |

(Continued)

FOREIGN PATENT DOCUMENTS

| GB | 2179953 A | 3/1987 |
| KR | 100863382 B1 | 10/2008 |
| WO | WO-2020080988 A1 * | 4/2020 | ............. C08L 29/04 |

OTHER PUBLICATIONS

Kuraray, Kuraray Poval(TM) 200-88KX SB, Ver 1, revision date May 26, pp. 1-4 (Year: 2018).*

(Continued)

*Primary Examiner* — Jose A Fortuna
(74) *Attorney, Agent, or Firm* — Alston & Bird LLP

(57) ABSTRACT

The invention relates to a method of transferring a tissue web with residual moisture to a Yankee cylinder and final removal of the dried tissue web from the Yankee cylinder using a doctor blade and collecting the dried web on a reel-up machine forming a tissue reel. The invention also relates to the Yankee adhesive composition per se. The method involves preparation of a water solution of a Yankee adhesive composition with less than 10% final solids content to be applied on the surface of the Yankee cylinder ahead of transferring the tissue web with residual moisture to the Yankee cylinder. The inventive method applies an aqueous PVOH solution with a very high molecular weight polyvinyl alcohol as a part of the solid content of the Yankee adhesive in an amount ranging from 20-65% of the final solids content (Continued)

of the Yankee adhesive. The aqueous PVOH solution with the very high molecular weight polyvinyl alcohol establish a viscosity ranging from 90 cP to 300 cP.

16 Claims, 4 Drawing Sheets

(51) Int. Cl.
*C08L 29/04* (2006.01)
*D21F 5/18* (2006.01)

(56) References Cited

U.S. PATENT DOCUMENTS

| | | |
|---|---|---|
| 5,490,903 A | 2/1996 | Chen et al. |
| 5,591,306 A | 1/1997 | Kaun |
| 5,730,839 A | 3/1998 | Wendt et al. |
| 5,837,768 A | 11/1998 | Warchol et al. |
| 5,901,918 A | 5/1999 | Klerelid et al. |
| 6,187,137 B1 * | 2/2001 | Druecke ............... D21F 11/14 162/109 |
| 6,677,427 B1 | 1/2004 | Cheng et al. |
| 7,404,875 B2 | 7/2008 | Clungeon et al. |
| 7,608,164 B2 | 10/2009 | Chou et al. |
| 9,702,088 B2 | 7/2017 | White et al. |
| 2002/0037946 A1 | 3/2002 | Isozaki et al. |
| 2002/0173580 A1 | 11/2002 | Allen |
| 2005/0006040 A1 * | 1/2005 | Boettcher ............ D21H 21/146 162/111 |
| 2019/0292729 A1 * | 9/2019 | Tan ...................... D21H 21/146 |
| 2021/0070908 A1 * | 3/2021 | Moustafa ................. B31F 1/12 |
| 2021/0140110 A1 * | 5/2021 | Dhawan ............... C08G 73/028 |
| 2021/0310195 A1 * | 10/2021 | Bjerke ................ D21H 21/146 |

OTHER PUBLICATIONS

International Searching Authority, International Search Report and Written Opinion received for International Application No. PCT/SE2018/051067, dated May 22, 2019, 13 pages, Swedish Patent and Registration Office, Sweden.

* cited by examiner

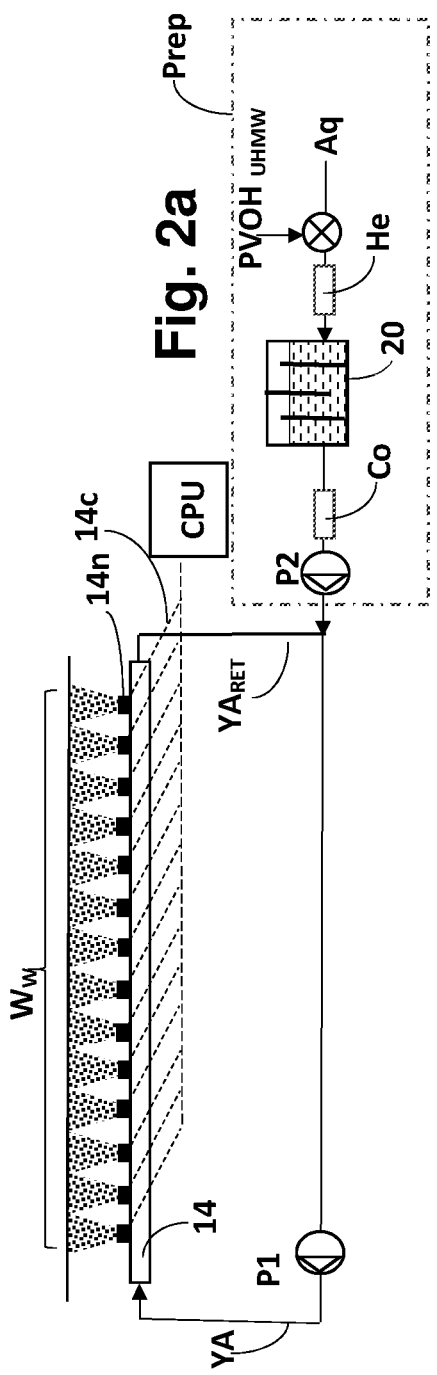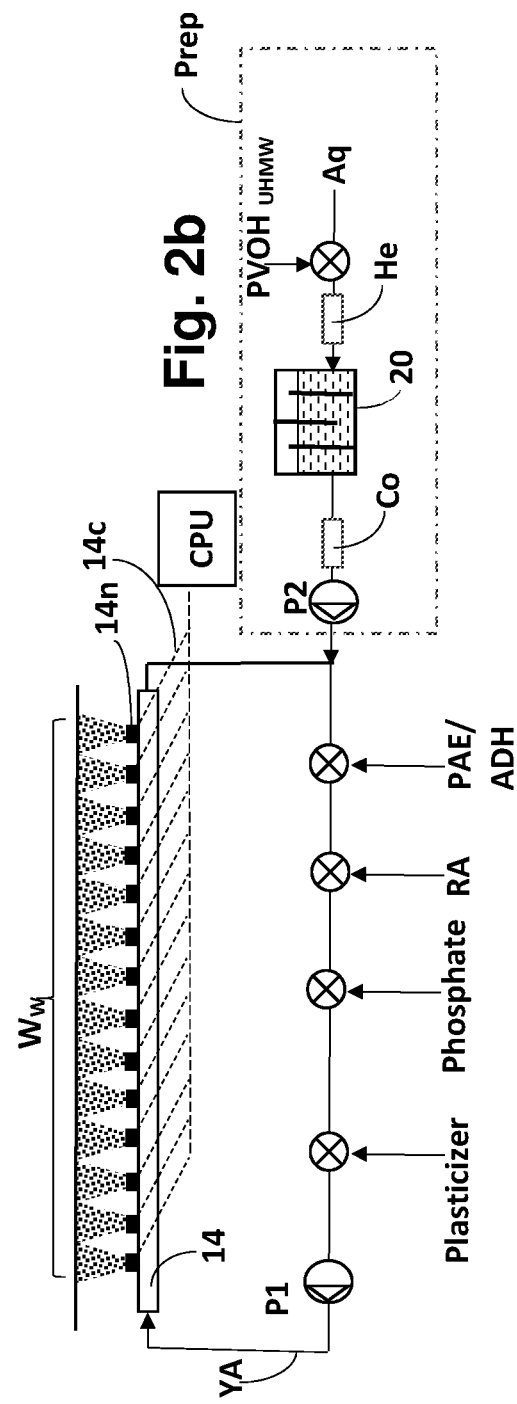

YANKEE ADHESIVE COMPOSITIONS AND METHODS OF USING THESE COMPOSITIONS

CROSS REFERENCE TO RELATED APPLICATIONS

This application is a National Stage Application, filed under 35 U.S.C. § 371, of International Application No. PCT/SE2018/051067, filed Oct. 19, 2018; the contents of which are hereby incorporated by reference in their entirety.

BACKGROUND

Related Field

This invention relates to improved Yankee adhesives used in making tissue webs with high absorbability, specifically, adhesives incorporating polyvinyl alcohol copolymer blends applied onto the Yankee cylinder before transfer of the tissue web to the Yankee and final take off from the Yankee with a doctor blade. The Yankee adhesive applied on the Yankee have two mutually conflicting effects sought for, i.e. first should the Yankee adhesive assist in proper transfer of the web onto the surface of the Yankee without breaking, i.e. provide a wet tack effect sucking the moist web onto the Yankee surface, and secondly should the Yankee adhesive facilitate the even removal by the doctor blade of the finally dried web from the surface of the Yankee. The effects are thus both as an adhesive and then secondly as a release agent. The conditions for transfer to and take off from the Yankee often results in a very narrow operating window for the tissue machine and several different kinds of Yankee adhesive compositions have been used and patented, all argued to improve or extend the operating window, most often with the objective to enable increase of tissue web speed and thus production capacity.

Tissue grades are typically manufactured by suspending cellulosic fibers in an aqueous medium at low consistencies around 1-3%. This water film is then distributed in a headbox over the width of a tissue machine and removal of water is following in several stages until a continuous web is formed. Removal of most of the water is taking place on a first draining web or felt, followed by additional gravity or vacuum-assisted drainage, with or without pressing. Final drying is obtained by evaporation on a Yankee dryer that many be preceded by a drying fabric and/or a textured felt. The Yankee drier is an unique process component in paper and tissue machines, and is a large heating cylinder heated internally by hot steam at high pressures, and classified as a pressure vessel that rotates at high peripheral speeds equal to the speed of the paper- or tissue web.

In the final take off of the tissue web from the Yankee using a doctor blade is a creping effect induced on the finally dried tissue web. The finally creped tissue web is wound onto a reel using a conventional drum reel-up or a belt reel-up corresponding to U.S. Pat. No. 5,901,918.

Tissue grades are typically made with higher bulk and with a certain order of crepe to fulfill the required soft feel-and-touch properties of absorbent products like paper napkins or toilet paper and are most often made with high absorbability. This means that handling of tissue webs in tissue machines are more demanding than handling paper webs in paper machines, as paper webs are produced with high density (low bulk) and with crosslinked fibers with high drag index (hence do not break that easy in the paper machine). Another important feature for the major part of the tissue production is the requirements on toilet paper to be able to be dissolved quickly when discarded in a water closets, avoiding risks for plugging the sewer pipes.

A Yankee adhesive is used to increase the wet tack effect when transferring the high bulk tissue web onto the Yankee cylinder, providing a good heat transfer from the hot surface of the Yankee cylinder to the bulky tissue web as well as improving the take-off of the bulky tissue web from the Yankee without causing web breakage.

Description of Related Art

Different types of thermosetting or non-thermosetting adhesive resins have been used as Yankee dryer adhesives, and include
poly(aminoamide)-epihalohydrin polymer (PAE) resins;
polyvinyl alcohol (PVOH) resins;
epichlorohydrin;
PEI resins;
PVAM resins;
Polyamine resins; and
PVP resins.

PAE adhesives are disclosed in U.S. Pat. No. 4,501,640 and is the most frequently used adhesive, with about 90% of the market volume. PAE is argued to offer superior adhesion as well as rewet ability. It is favored that the applied PAE layer is not consumed but stays on the surface of the Yankee more than one revolution of the Yankee cylinder and may be rewetted by another layer of PAE.

U.S. Pat. No. 7,608,164 disclose use of polyvinyl alcohol copolymer in Yankee compositions with PAE resins; however, no examples are provided. U.S. Pat. No. 7,404,875 is another example. Hence a number of known copolymers of polyvinyl alcohol has been proposed.

In US 2002/0037946 is disclosed a exhaustive listing of polyvinyl alcohol copolymers used.

In U.S. Pat. No. 9,702,088 is disclosed a method where PVOH is used as the resin and different qualities in the low-/medium/-high viscosity ranges are tested. The PVOHs tested results in a viscosity far below 90 Cp in 4% water solutions. Moreover, this patent relates to a simultaneous application of a softener to the web ahead of the Yankee and this claim covers a specific weight ratio between the PVOH and PAE resin in the range 3:1 to 7:1, i.e. the weight of PVOH at least 3 times that of PAE resin.

PVOH is typically used in an aqueous solution at some 4-5% concentration, and this may be bought as a pre-mixed aqueous solution or mixed at the site of the tissue machine. Mixing at site is the most common approach as this reduce cost over time, as only the granular/powder form of PVOH needs to be acquired and in lower volumes.

Conventional Yankee adhesives using PVOH normally use PVOH in granular or powder form that is easily mixed into the water solution and therefore practically avoid using PVOH with very high molecular weight.

SELVOL™ promotes grades of PVOH in four viscosity ranges; "Ultra low", "Low", "Medium" and "High" with properties as listed in the following table

| Viscosity type | Viscosity (cps) | Degree of Polymerization | Weight Average Molecular Weight Range |
| --- | --- | --- | --- |
| Ultra Low | 3-4 | 150-300 | 13,000-23,000 |
| Low | 5-6 | 350-650 | 31,000-50,000 |
| Medium | 22-30 | 1000-1500 | 85,000-124,000 |

-continued

| Viscosity type | Viscosity (cps) | Degree of Polymerization | Weight Average Molecular Weight Range |
|---|---|---|---|
| High | 45-72 | 1600-2200 | 146,000-186,000 |

Two grades of PVOH commonly used as Yankee adhesives are the Selvol 540 and Selvol 523 grades. The grade Selvol 540 could establish a viscosity in the range 45.0-55.0 cps while Selvol 523 could establish a viscosity in the range 23.0-27.0 cps, all in a 4% aqueous solution (at 20° C.). Even though Selvol 540 has a molecular weight more than double that of Selvol 523, Selvol 523 is often replacing Selvol 540 as adhesives in many tissue machines.

BRIEF SUMMARY

The invention is related to improved functional usage of Yankee adhesives where the Yankee could be operated at higher speeds and thus increase production capacity, with improved wet tack transfer and without causing web breakage at take-off. A Yankee adhesive with higher viscosity at the Yankee transfer nip helps at improving uniformity of the sheet transfer to the Yankee and therefore improves uniformity in the cross-wise direction of the web and hence even roll diameter in the final take-up roll.

Further, unevenness in the CD direction in the reeling drum is decreased, resulting in uniform diameter of the paper reels produced, which in turn may offer more turns of tissue web wound on each individual paper reel and uniform content (in meter tissue web).

The invention also reduces consumption of Yankee adhesives as the Yankee adhesive penetrate into the tissue web to a lesser extent. Hence is less amount of Yankee adhesive brought into the final paper reel which also results in significantly faster dissolving of the tissue web when disposed into the sewer. As less Yankee adhesive is caught in the web is the residual coating thicker after take-off position which leads to that less new Yankee adhesive is to be applied on the Yankee surface. This will also reduce depositions of Yankee adhesives in subsequent processing equipment.

It has surprisingly been shown in tests that the usage very high molecular weight PVOH results in dramatically improved wet tack transfer using less amount of PVOH in running production as most of the PVOH stays put on the surface of the Yankee cylinder.

Less PVOH also diffuse into the tissue web resulting in a tissue product such as toilet paper that dissolves much faster when disposed of in a water closet. This is of outmost importance for preventing build-up of blocking plugs in the sewer system.

The quality in paper rolls as of even and constant roll diameter also improves. If this very high molecular weight PVOH is handled properly during preparation ahead of application of the Yankee adhesive, guaranteeing a longer residence time at elevated temperature, could the full improvement be obtained, even if handling of the PVOH may be somewhat more demanding.

The inventive method involves transferring a tissue web with residual moisture to a Yankee cylinder and final removal of the dried tissue web from the Yankee cylinder using a doctor blade. The dried web is collected on a reel-up machine forming a tissue reel. The inventive method comprises following steps:

(a) preparing a water solution of a Yankee adhesive with less than 10% final solids content to be applied on the surface of the Yankee cylinder ahead of transferring the tissue web with residual moisture to the Yankee cylinder;

(b) adding an aqueous PVOH solution with a very high molecular weight polyvinyl alcohol into the solution of the Yankee adhesive in an amount ranging from 25-65% of the final solids content of the Yankee adhesive reaching a resulting viscosity ranging from 90 cP to 300 cP in the aqueous PVOH solution.

Using this aqueous PVOH solution as a part of the Yankee adhesive, with a resulting viscosity ranging from 90 cP to 300 cP in the aqueous PVOH solution results in dramatic improvement in production capacity and obtains even final rolls with tissue products that are more easily dissolved than any other tissue product produced using state of the art Yankee adhesives.

According to one preferred embodiment may the aqueous PVOH solution be prepared on site. Thus, the inventive method may involve that the aqueous PVOH solution is heated to a temperature in the range 80-100° C. during storage of the aqueous PVOH solution. Such heating will dissolve the raw PVOH material better in a water solution as well as initiate a swelling of the PVOH before being added to the water solution of the Yankee adhesive. Further, the inventive method may also include that the heated aqueous PVOH solution is cooled down to a temperature in the range 40-65° C. before adding the aqueous PVOH solution into the solution of the Yankee adhesive. This lower temperature is beneficial when applying the final Yankee adhesive on the Yankee as the water content may be prevented from evaporation already at initial application of the Yankee adhesive.

According to an alternative embodiment of the inventive method may a premade aqueous PVOH solution be added into the water solution of the Yankee adhesive. Hence, the aqueous PVOH solution may be bought in tanks, avoiding investments in specific mixing systems for the aqueous PVOH solution.

According to yet a further embodiment of the inventive method may a release agent be mixed into the aqueous PVOH solution in an amount ranging from 10-40% of the final solids content of the Yankee adhesive. The release agent is needed to facilitate easy final take-off of the dried web and prevents web breakage and assists in production of even final rolls with uniform diameter. The release agent is selected from a group of release agents including a b c d e f.

The inventive method may further involve mixing of an additional creping adhesive agent, besides the very high molecular weight polyvinyl alcohol, into the aqueous PVOH solution in an amount ranging from 15-45% of the final solids content of the Yankee adhesive. Additional creping adhesive agent may result in a synergetic improvement as it may not change the high viscosity of the aqueous PVOH solution and may reduce costs as additional creping adhesive may be much cheaper than the very high molecular weight polyvinyl alcohol. The total part of the solids content in the Yankee adhesive from the very high molecular weight polyvinyl alcohol may thus be reduced. The additional creping adhesive agent is preferably a thermosetting or non-thermosetting adhesive resins selected from a group of creping adhesive agents including poly(aminoamide)-epihalohydrin polymer (PAE) resins; other polyvinyl alcohol (PVOH) resins, epichlorohydrin, PEI resins, PVAM resins, Polyamine resins and PVP resins. In a preferred method of use may the weight ratio between the PVOH and PAE resin be in the range 1:1 to 2.5:1.

In a preferred implementation of the method when the aqueous PVOH solution is mixed on site by adding PVOH powder into a flow of water using a mixer, involves initial heating the aqueous PVOH solution to about 80-130° C. and storing the aqueous PVOH solution during a minimum time period of 45-200 minutes, and before feeding the aqueous PVOH solution onto the Yankee cylinder cooling the aqueous PVOH solution to a lower temperature in the range 40-65° C.

In yet a preferred embodiment of the inventive method may the additional additives be added to the aqueous PVOH solution using additional mixers for mixing these additional additives. Hence, each additive may use a dedicated mixer type, and if mixed into the aqueous PVOH solution adds further mixing effect also on the very high molecular weight polyvinyl alcohol, keeping it well dispersed in the aqueous PVOH solution.

Preferably, each additive is mixed into the aqueous PVOH solution, using a dedicated mixer for each additive. The aqueous PVOH solution may thus pass several mixers for different additives before being applied onto the surface of the Yankee cylinder as the final Yankee adhesive (YA).

According to a preferred embodiment may also a release agent be mixed into the aqueous PVOH solution after a storage time of the aqueous PVOH solution and within 5 minutes from application of the final Yankee adhesive (YA) onto the Yankee surface. Hence, the release agent may not need extended retention time in the aqueous PVOH solution and may be mixed shortly before application of the Yankee adhesive.

The additional creping adhesive agent may also in an alternative embodiment of the inventive method be mixed into the aqueous PVOH solution after a storage time of the aqueous PVOH solution and within 5 minutes from application of the final Yankee adhesive (YA) onto the Yankee surface.

The inventive method is preferably used on a Yankee where the tissue web is partially dried to a consistency of at least 35% prior to transferring the tissue web with residual moisture to the Yankee cylinder. Its also preferably used on a Yankee where the tissue web is dried to a consistency of at least 90% upon final removal of the dried tissue web from the Yankee cylinder.

The invention also relates to a Yankee adhesive composition as such comprising
- a water solution containing at least 90% per weight of water and up to 10% by weight of solids;
- a part of the solids content containing a very high molecular weight polyvinyl alcohol (PVOH) in an amount ranging from 25-65% of the solids and added into the Yankee adhesive composition as an aqueous PVOH solution;
- which aqueous PVOH solution has a viscosity ranging from 90 cP to 300 cP.

This composition of Yankee adhesive will to a great extent obtain same order of high viscosity as the aqueous PVOH solution, and additional additives will only change the final viscosity of the Yankee adhesive less than 10% of the viscosity of the aqueous PVOH solution, while the amount of very high molecular weight polyvinyl alcohol (PVOH) is limited to an amount ranging from 25-65% of the solids.

The inventive Yankee adhesive per se may also contain a part of the solids content containing a release agent in an amount ranging from 10-40% of the solids content. This means that the total content of solids in the Yankee adhesive, i.e. up to 10% per weight, only need to contain some 1-4% of the total solids content as a release agent.

The inventive Yankee adhesive per se may also contain a part of the solids content containing an additional creping adhesive agent in an amount ranging from 15-35% of the solids content. This means that the total content of solids in the Yankee adhesive, i.e. up to 10% per weight, only need to contain some 1.5-3.5% of the total solids content as an additional creping adhesive agent.

The Yankee adhesive composition as defined above obtain better properties than previously known adhesive compositions using high molecular weight PVOH but not close to establishing the viscosity when using the PVOH with very high molecular weight, and where the total content of PVOH is relatively low and preferably may be mixed with a part of PAE as additional creping adhesive agent, but in so small parts that the viscosity in the final Yankee adhesive is not seriously affected.

BRIEF DESCRIPTION OF THE FIGURES

The invention is described in detail with reference to following figures in which:

FIG. 2a is a schematic layout of a Yankee adhesive application system in a first embodiment;

FIG. 2b is a schematic layout of a Yankee adhesive application system in a second embodiment;

DETAILED DESCRIPTION OF VARIOUS EMBODIMENTS

As to definitions of web consistency is weight percent used, meaning that a 35% web consistency comprises 65% water per weight, and 35% bone dry pulp (including fillers, brightening agents etc).

As to definitions of Yankee adhesive compositions is a composition including 90% water and 10% total solids comprising 90% water per weight and the total solids comprising in total 10% solids per weight.

"Wet-tack" refers generally to the ability of an adhesive coating on a Yankee drying cylinder to adhere a wet web to the Yankee before additional drying on the Yankee cylinder.

Polyvinyl alcohol resins, hereinafter referred to as PVOH, may be manufactured using differing processes and obtaining differing degree of polymerization. However, the degree of polymerization is not clearly related to obtainable viscosity in an aqueous solution as some PVOH with higher degree of polymerization could result in lower obtainable viscosity in an aqueous solution than another PVOH with lower degree of polymerization. The same applies for choosing molecular weight as a definition on the PVOH used. The important feature is the viscosity that may be obtained when mixing the PVOH in an aqueous solution.

Besides the content of PVOH, additional resins and release agents could also modifiers be added, said modifiers preventing the adhesive film from hardening. Modifiers include quaternary ammonium complexes, polyethylene glycols, phosphate salts, ethylene glycol propylene glycol, polyethylene glycol, oligosaccharides etc.

Figure 1:
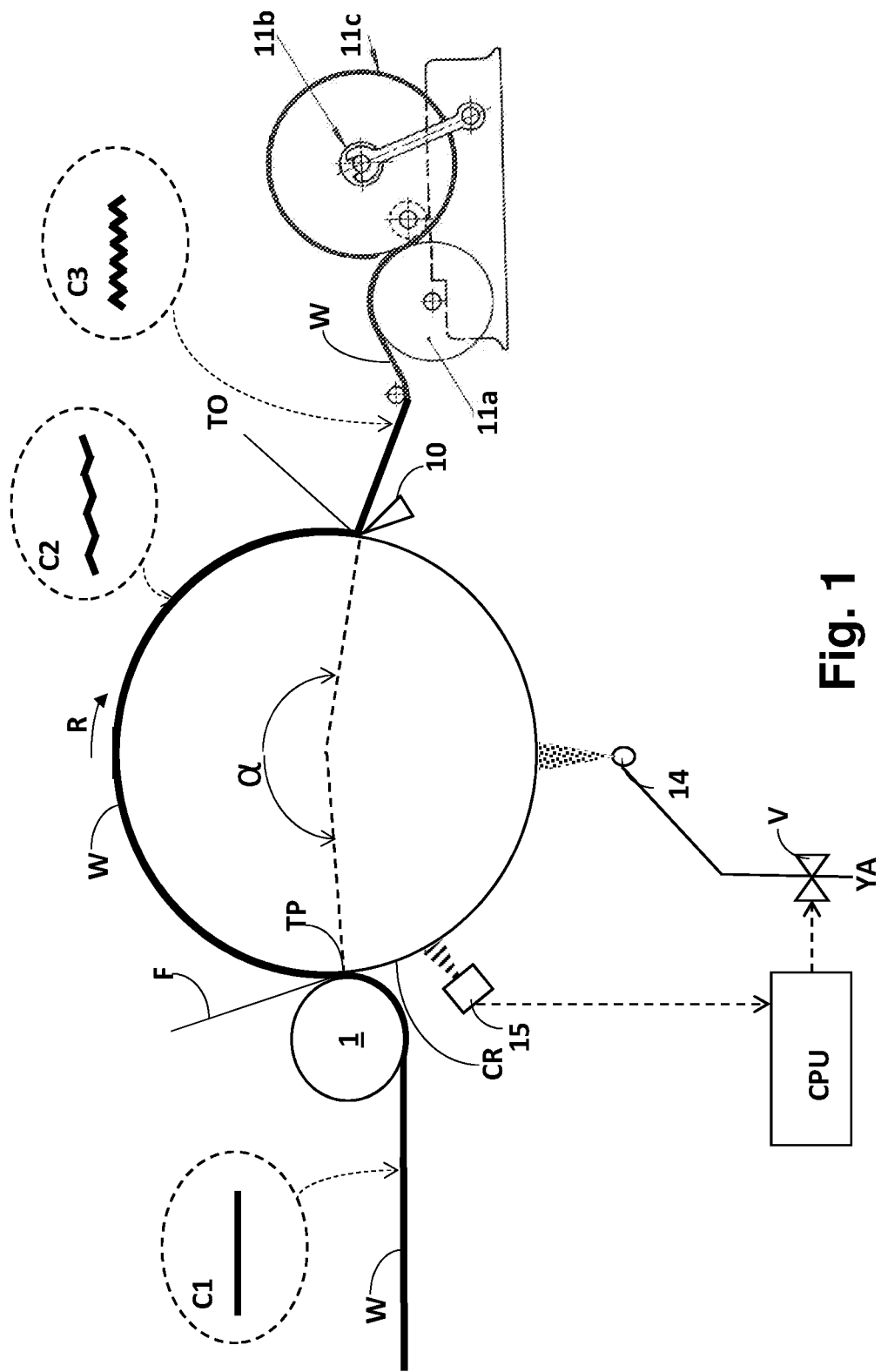
FIG. 1 is a schematic layout of a part of a tissue machine wherein a tissue web is fed, transferred to the surface of a Yankee cylinder and finally taking off the dried web and collecting the web on a paper reel.

In FIG. 1 is shown schematically the final part of a tissue machine, where a tissue web W is transferred in a transfer position TP to a Yankee Cylinder CR, often referred to as creping roll. The tissue web W is conveyed to the transfer position on any appropriate felt F and the web is transferred to the surface of the Yankee CR in a transfer nip between a roll 1 and the Yankee Cylinder CR.

As indicated here is the web more or less flat, see encircled figure C1, but may have obtained some structured surface from the felt F before the transfer position. A first order of crepe may or may not be induced on the web during the transfer, see encircled figure C2, by a decrease of speed in the Yankee VS the preceding felt F.

The Yankee is a cylinder heated internally by steam at high pressure, resulting in a drastic reduction of water in the web. The web is exposed for drying during the passage over the angle α. The web is thereafter removed from the Yankee cylinder in a take-off position TO using a doctor blade 10. The doctor blade may induce a final order of crepe in the web, see encircled figure C3.

After takeoff the web is led to a conventional reeling drum 11b forming a paper reel 11c. The reeling drum 11b is driven by a supporting cylinder 11a.

As shown in FIG. 1 is a Yankee adhesive YA applied on the surface of the Yankee ahead of the transfer position TP. The amount of Yankee adhesive applied may be controlled by a valve V, which may be a manually controlled valve set at any appropriate feed rate or be controlled in a close loop by a control Unit CPU depending upon the measured thickness of Yankee adhesives after application.

The thickness of the Yankee adhesive may be measured by any state-of-the-art non-contact measuring means 15.

In FIGS. 2a-2d are shown 4 different principal layouts of the Yankee adhesive application system.

In FIG. 2a is a first basic system layout disclosed wherein only PVOH is added as an aqueous solution into the Yankee adhesive YA. The Yankee adhesive application system comprises a first supply boom 14 with several nozzles 14n arranged over the entire width of the Yankee cylinder, or minimum over a part width $W_W$ that carries the web. Preferably may each nozzle 14n be controlled individually by a unique driver signal 14c, which in response to a single measuring head in the measuring means 15 may adjust application rate of the Yankee adhesive in the narrow strip of the web width. The supply boom 14 is pressurized with a pump P1 feeding Yankee adhesives from a storage container 20 as well as from a return flow from the supply boom 14. As indicated here may the supply boom be subject to a continuous flow of Yankee adhesive, such that a part of the Yankee adhesives fed to the supply boom is returned to the pump P1. The circulation rate back to the pump P1 may be 20-80% of the volume of Yankee adhesive feed to the supply boom. In the first basic system layout is new Yankee adhesives added in a PVOH preparation system Prep in a separate feed flow replacing the volumes fed out via the nozzles 14n. As it is an aqueous solution is clean water Aq added, possibly via a heater that heats the water to about 80-100° C. at the most during initial mixing with fresh PVOH. But in this first embodiment is the heater located after a mixer. Somewhat higher temperature may be established after initial mixing with colder water, to about 130° C. at the most, but then the storage container needs to be designed as a pressure vessel which add cost. Heating during initial mixing with fresh PVOH to 80-130° C. improve further mixing of very high molecular weight polyvinyl alcohol and allowing the molecular chains to untangle from each other, as well as causing a swelling of the PVOH. Depending on type of PVOH may a maximum temperature be at hand where the excessive heating may cut the length of the molecular chains (which must be prevented).

Thereafter is the aqueous solution with very high molecular weight polyvinyl alcohol $PVOH_{UHMW}$ fed to a storage container 20. As the molecular chains of the very high molecular weight polyvinyl alcohol are very long, and it takes time to untangle the chains from each other it is important that the heated aqueous solution with PVOH is stored for a longer time in order to obtain best effect. The storage container may thus be divided in several compartments establishing a longer storage time for the entire volume of the PVOH solution. In FIG. 2a is the fresh mixture of the aqueous PVOH solution, having had no storage time, fed into the bottom of a first compartment. Addition into the bottom suppress formation of PVOH as a layer in the bottom. First after having had the retention time in all compartments may the Yankee coating YA be fed out from the bottom of a final compartment. The temperature of the aqueous PVOH solution fed out from the storage container 20 is here about 80-130° C. and needs to be reduced before being fed to the boom 14, and hence is a cooler Co used to lower the temperature down to about 40-65° C. This kind of preparation system Prep is preferably used in tissue machines with high production rate, where consumption of PVOH become high, allowing use of fresh PVOH to be mixed on site instead of buying already mixed aqueous solution, which latter option is more expensive. However, the Prep system may alternatively be replaced by a pump P2 sucking already mixed aqueous solution of PVOH from barrels or tanks.

In FIG. 2b is a second basic system layout disclosed. The difference here is that a number of additives are mixed into the recirculation loop of the boom 14. Each additive may be added in a dedicated mixer as shown here, preferably using a static mixer. The additives may include at least an additional creping adhesive agent such as PAE/ADH, and a release agent RA, and a plasticizer. The order of mixing these additional additives into the recirculation is preferably done in view of how easy each additive is to be evenly mixed into the recirculation. As to the very high molecular weight PVOH mixed into water in the preparation system, this additive will be subjected to the mixer in the preparation system, and then also be subjected to additional remixing in each following mixers for additional additives. Gentle repeat mixing in static mixers will improve a thorough mixing of the very high molecular weight PVOH.

Figure 2C:
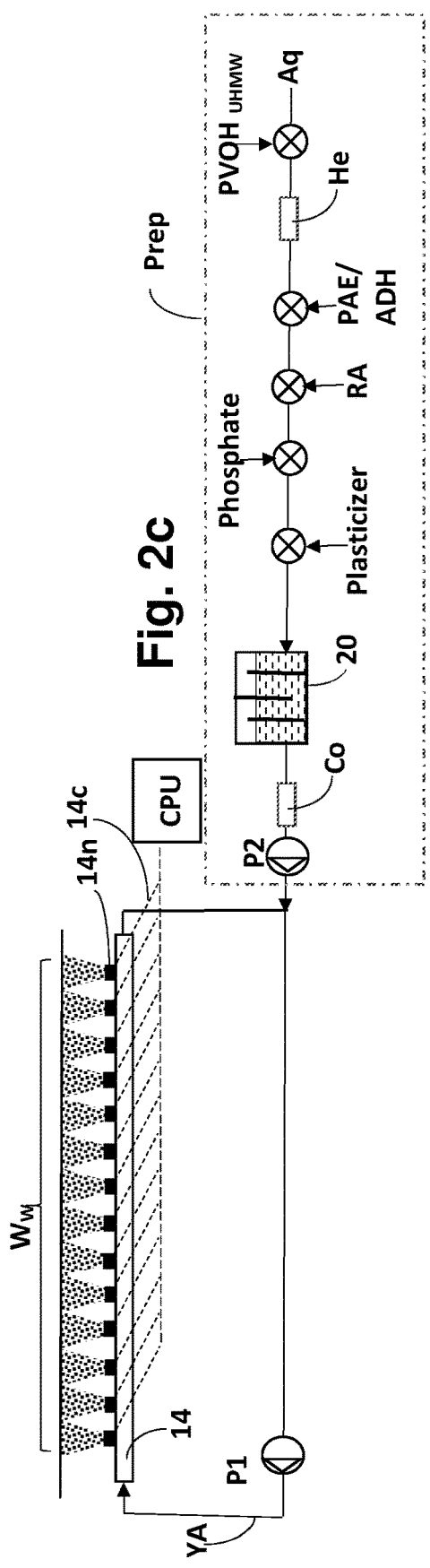
FIG. 2c is a schematic layout of a Yankee adhesive application system in a third embodiment.

In FIG. 2c is a third basic system layout disclosed. The difference here is that all additives are mixed in the preparation system Prep before entering the recirculation flow. In this embodiment is the most difficult additive to be mixed, the very high molecular weight PVOH, added first in a dedicated mixer, thereafter heated, and subsequently follows mixing of complementary additives in a sequence of dedicated mixers before being fed to a storage container 20. Before being pumped into the recirculation is the new Yankee adhesive cooled in a cooler Co.

Figure 2D:
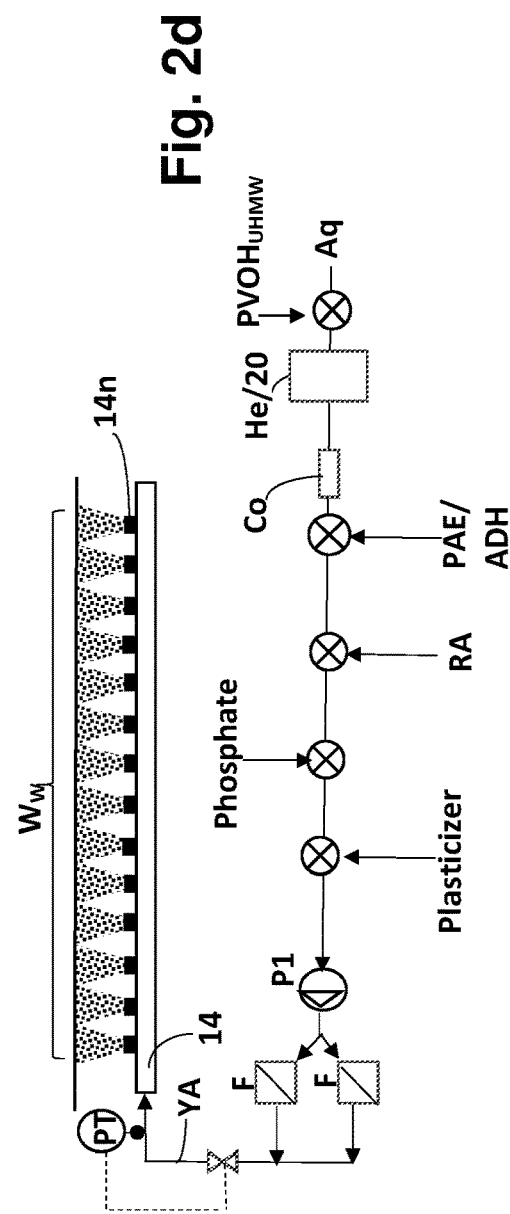
FIG. 2d is a schematic layout of a Yankee adhesive application system in a fourth embodiment.

In FIG. 2d is a fourth basic system layout disclosed, but here without a recirculation flow from the boom back to the feed flow to the boom. The very high molecular weight PVOH is first mixed into a feed flow of water Aq and passed on to a container 20 with integrated heating. After sufficient storage time is the aqueous solution of PVOH fed via a cooler Co to a first mixing station for an additional additive, in this case additional creping adhesive agent such as PAE/ADH. Thereafter may a release agent RA, phosphate and a plasticizer be added in a sequence of dedicated mixers.

The final Yankee additive mixed in this way and fed to the boom may also pass a filtering system with at least 2 filters F in parallel, that may prevent larger particles to pass to the boom where the nozzles may become blocked. Using parallel filters enables back flushing and cleaning of one filter at the time while still being able to feed Yankee additive trough the filter that still is in a filtering mode.

The basic systems layouts of FIGS. 2a-2c all include a return line $YA_{RET}$ from the boom 14 back to the storage container or the pump P1, but this return line may be omitted in systems with large consumption of the Yankee adhesive (i.e. for larger tissue machines), like the system shown in FIG. 2d. But the return line adds several advantages as it adds a stirring effect in the storage container 20 at re-introduction and increases the total averaged residence time of the Yankee adhesives as well as subject the aqueous solution for repeated mixing.

Figure 3:
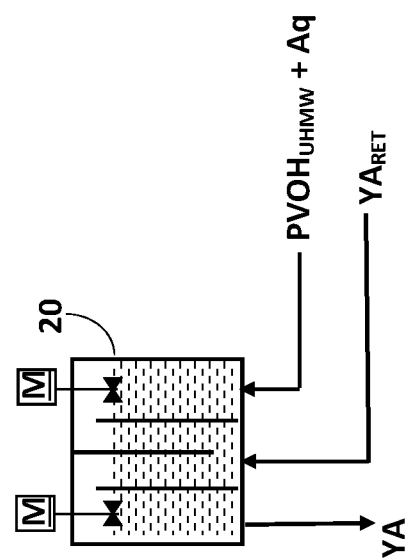
FIG. 3 is an alternative embodiment of a retention vessel used to prepare and store the Yankee adhesive composition.

In FIG. 3 is an alternative storage container 20 shown. This is a design with four chambers in series, needing only 3 partition walls. The fresh aqueous solution with water and PVOH is fed to the bottom of a first right hand side chamber in the storage container 20. This inflow in the bottom suppress sedimentation of PVOH in this chamber. From the first chamber the aqueous solution overflows to a second and third chamber having an inlet in the bottom of the return flow $YA_{RET}$. And first when the aqueous solution has passed the first three chambers it overflows to a final fourth chamber on the left-hand side. As shown here may also a number of motor driven agitators be arranged, having stirring members that breaks up any flocs formed on the upper liquid surface.

Tests

The Yankee Adhesive that was ran had a total add-on of: 15-35 mg/m2, and contained Crepetrol 9750: 20-65%
Crepetrol 874 and Rezosol CS-3290: 10-40%
Kuraray KP200-88 KX: 25-65%

The findings from the tests shows that Yankee coating will work with PAE, non-PAE resins, thermosetting (crosslinking) and non-thermosetting resins (fully-crosslinked) as Yankee adhesive are mainly becoming active and providing adhesion at crepe blade and less at the Yankee transfer nip unlike PVOH. Non-PAE resin includes GPAM resins, PVAM and derivatives from these, CPAM, APAM, inter-penetrating networks (IPNs) used directly into coating system or into the wet-end of the paper machine. The Yankee coating package will work whether a phosphate additive is used or not in the Yankee coating (MAP, DAP, TKPP and other kind of polyphosphate).

Effect of Kuraray KP200-88 KX (very high MW PVOH) was enhanced when used in combination with CS-3290 Yankee modifier. The viscosity of Kuraray KP200-88 KX obtained in a 4% aqueous solution at 20° C. would lie in the range 175.0-225.0 cP.

Kuraray KP200-88 KX was compared with Selvol 523 and Selvol 540.

Selvol 523, classified as medium MW PVOH by Sekisui, obtained a viscosity in a 4% aqueous solution at 20° C. that lies in the range 23.0-23.7 cP and this at a hydrolysis level of 87.0-89.0%.

Selvol 540, classified as high MW PVOH by Sekisui, obtained a viscosity in a 4% aqueous solution at 20° C. that lies in the range 45-55 cP. and this at a hydrolysis level of 87.0-89.0%. Selvol 350 is also an alternative but could obtain a viscosity in the range 60-72 cP.

Viscosity range for Kuraray product KP200-88 KX tested is close to 4 times higher than standard Selvol 540. Kuraray refers KP200-88 KX as premium PVOH grade/product. The hydrolysis level of KP200-88 KX lies in the range 87.0-89.0%, i.e. the same as for Selvol 523/540, and this shows that the hydrolysis level per se do not clearly indicate what kind of viscosity may be obtained.

The Rezosol CS-3290 is modifier chemistry supplied by Solenis LLC. It also worked with Crepetrol 874 (surfactant based modifier). It can work with other modifiers such imidazoline quaternary amine based Yankee modifiers and suit applications using oil based release (mineral or vegetal oil release).

This can be implemented in a wide range of total add-on, i.e. in the range: 1-150 mg/m² and over a wide range of ratios for each of the component as conditions may vary quite a lot from one machine to another machine depending on, furnish, moisture conditions, etc.

This should be wide enough to cover tissue manufacturing processes such as Through air-drying (TAD), NTT, QRT, Single or double recrepe (SRC or DRC), Advanced Molding Tissue System (ATMOS) as well as conventional light dry-crepe assets (LDC)

The invention claimed is:

1. A method of for improving transferring of a tissue web (W) with residual moisture to a Yankee cylinder (CR) and final removal of the dried tissue web from the Yankee cylinder using a doctor blade, and collecting the dried web on a reel-up machine forming a tissue reel, the method comprising:
    (a) preparing a water solution of a Yankee adhesive with less than 10% final solids content to be applied on the surface of the Yankee cylinder ahead of transferring the tissue web with residual moisture to the Yankee cylinder;
    (b) adding an aqueous polyvinyl alcohol (PVOH) solution into the solution of the Yankee adhesive in an amount ranging from 25-65% of the final solids content of the Yankee adhesive, wherein the aqueous PVOH solution has a viscosity ranging from 111 mPa-s to 300 mPa-s when the aqueous PVOH solution is 4% aqueous and at a temperature of 20° C.; and
    (c) applying the solution of the Yankee adhesive with the added aqueous PVOH solution on a surface of the Yankee cylinder (CR) ahead of a transfer position (TP), whereby the transferring of the tissue web (W) with residual moisture to the Yankee cylinder and the final removal of the dried tissue web from the Yankee cylinder are improved.

2. The method according to claim 1, wherein the aqueous PVOH solution is heated to a temperature in the range 80-100° C. during storage of the aqueous PVOH solution.

3. The method according to claim 2, wherein the heated aqueous PVOH solution is cooled down to a temperature in the range 40-65° C. before adding the aqueous PVOH solution into the solution of the Yankee adhesive.

4. The method according to claim 1, wherein a pre-made aqueous PVOH solution is added into the water solution of the Yankee adhesive.

5. The method according to claim 1, wherein a release agent is mixed into the aqueous PVOH solution in an amount ranging from 10-40% of the final solids content of the Yankee adhesive.

6. The method according to claim 5, wherein the release agent is mixed into the aqueous PVOH solution after a storage time of the aqueous PVOH solution and within 5 minutes from application of the final Yankee adhesive (YA) onto the Yankee surface.

7. The method according to claim 1, wherein an additional creping adhesive agent is mixed into the aqueous PVOH solution in an amount ranging from 15-45% of the final solids content of the Yankee adhesive.

8. The method according to claim 7, wherein the additional creping adhesive agent is a thermosetting or non-thermosetting adhesive resins selected from a group of creping adhesive agents including poly(aminoamide)-epihalohydrin polymer (PAE) resins; other polyvinyl alcohol (PVOH) resins, epichlorohydrin, PEI resins, PVAM resins, Polyamine resins and PVP resins.

9. The method according to claim 8, wherein the weight ratio between the PVOH and PAE resin is in the range 1:1 to 2.5:1.

10. The method according to claim 7, wherein the additional creping adhesive agent is mixed into the aqueous PVOH solution after a storage time of the aqueous PVOH solution and within 5 minutes from application of the final Yankee adhesive (YA) onto the Yankee surface.

11. The method according to claim 1, wherein the aqueous PVOH solution is mixed on site by adding PVOH powder into a flow of water using a mixer, heating the aqueous PVOH solution to about 80-130° C. and storing the aqueous PVOH solution during a minimum time period of 45-200 minutes, and before feeding the aqueous PVOH solution onto the Yankee cylinder cooling the aqueous PVOH solution to a lower temperature in the range 40-65° C.

12. The method according to claim 1, wherein additional additives are added to the aqueous PVOH solution using additional mixers for mixing these additional additives.

13. The method according to claim 12, wherein each additive is mixed into the aqueous PVOH solution, using a dedicated mixer for each additive.

14. The method according to claim 13, wherein the aqueous PVOH solution is passing several mixers for different additives before being applied onto the surface of the Yankee cylinder as the final Yankee adhesive (YA).

15. The method according to claim 1, wherein the tissue web is partially dried to a consistency of at least 35% prior to transferring the tissue web with residual moisture to the Yankee cylinder.

16. The method according to claim 15, wherein the tissue web is dried to a consistency of at least 90% upon final removal of the dried tissue web from the Yankee cylinder.

* * * * *